United States Patent [19]

Nakamoto et al.

[11] 4,106,033

[45] Aug. 8, 1978

[54] SYSTEM FOR INDICATING PHOTOGRAPHING CONDITIONS

[75] Inventors: Soichi Nakamoto, Machida; Nobuaki Sakurada, Yokohama; Tadashi Ito, Yokohama; Fumio Ito, Yokohama; Nobuhiko Shinoda, Tokyo, all of Japan

[73] Assignee: Canon Kabushiki Kaisha, Tokyo, Japan

[21] Appl. No.: 697,108

[22] Filed: Jun. 17, 1976

Related U.S. Application Data

[63] Continuation of Ser. No. 514,895, Oct. 15, 1974, abandoned.

[30] Foreign Application Priority Data

Oct. 17, 1973 [JP] Japan .................................. 48-116577

[51] Int. Cl.² .......................... G03B 7/08; G03B 17/20
[52] U.S. Cl. ................................... 354/23 D; 354/53; 354/60 L

[58] Field of Search .................. 354/23 D, 50, 51, 53, 354/60 R, 60 A, 60 L

[56] References Cited

U.S. PATENT DOCUMENTS

| 3,744,385 | 7/1973 | Rurgarelle et al. | 354/23 D |
| 3,824,608 | 7/1974 | Toyoda | 354/23 D |
| 3,842,587 | 10/1974 | Strauss et al. | 354/23 D |

FOREIGN PATENT DOCUMENTS

| 2,364,851 | 7/1974 | Fed. Rep. of Germany | 354/23 D |
| 2,535,329 | 2/1976 | Fed. Rep. of Germany | 354/23 D |

*Primary Examiner*—Russell E. Adams
*Attorney, Agent, or Firm*—Toren, McGeady and Stanger

[57] ABSTRACT

A camera having a digital exposure control device which converts photographing informations into digital amounts and computes them according to the Appex system, and in which the Appex value of the photographing conditions supplied by the above computing operation is converted into practical indications such as numerical references.

4 Claims, 8 Drawing Figures

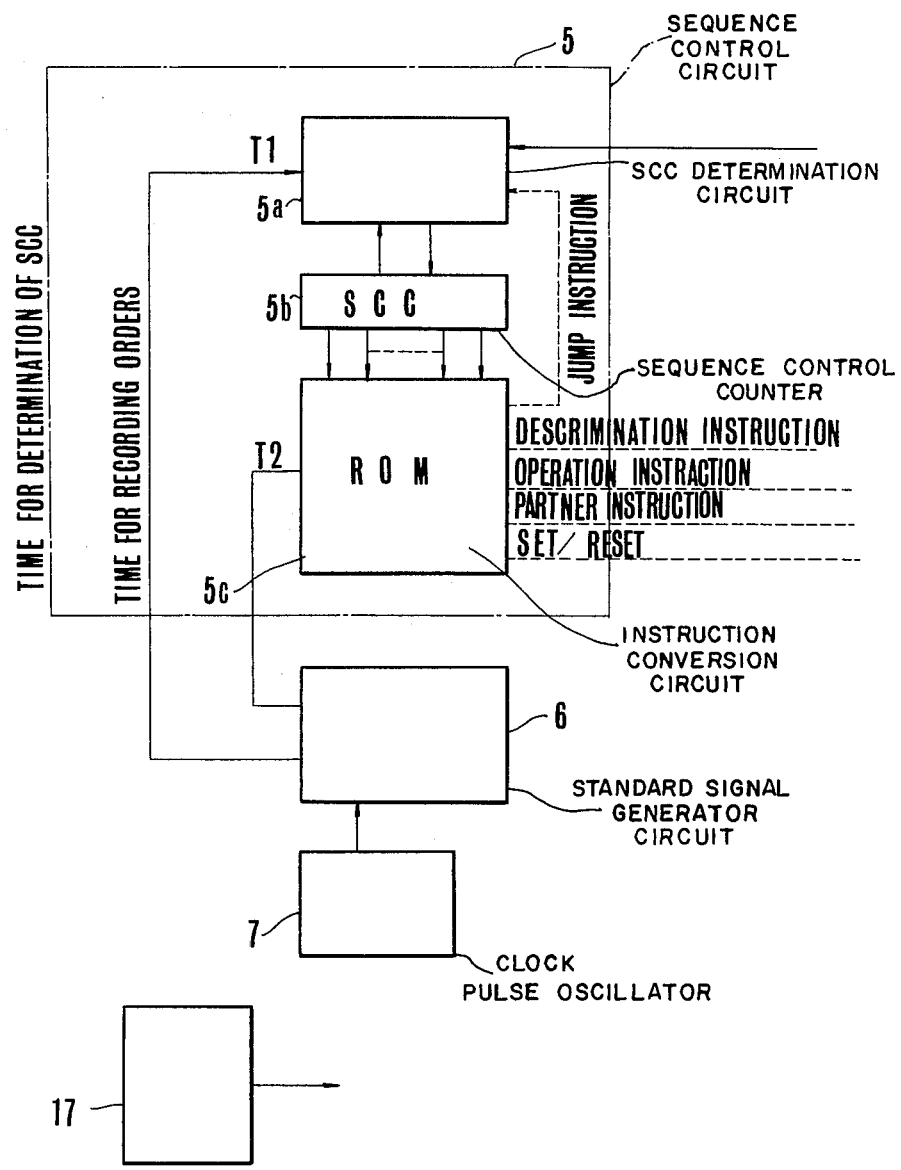

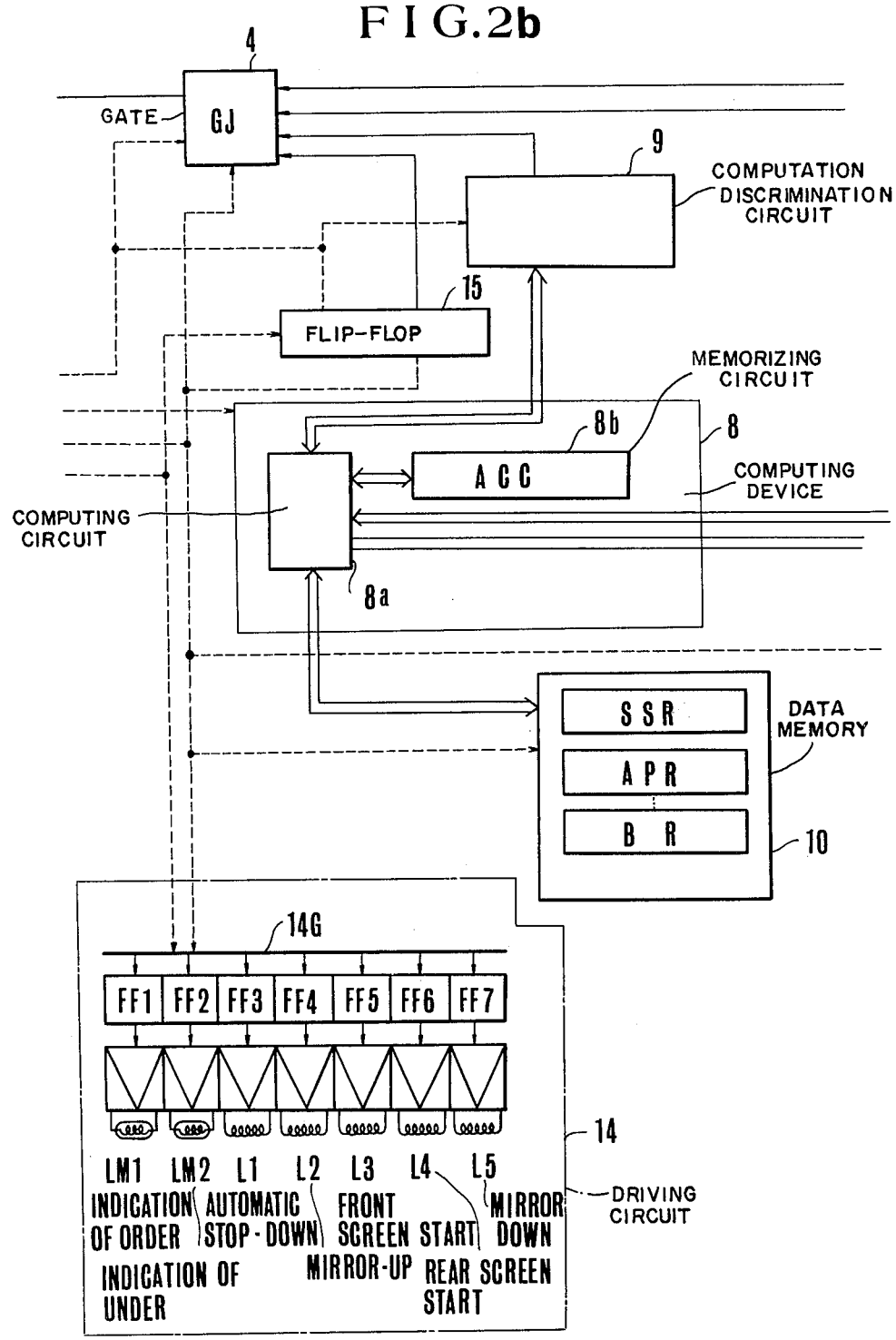

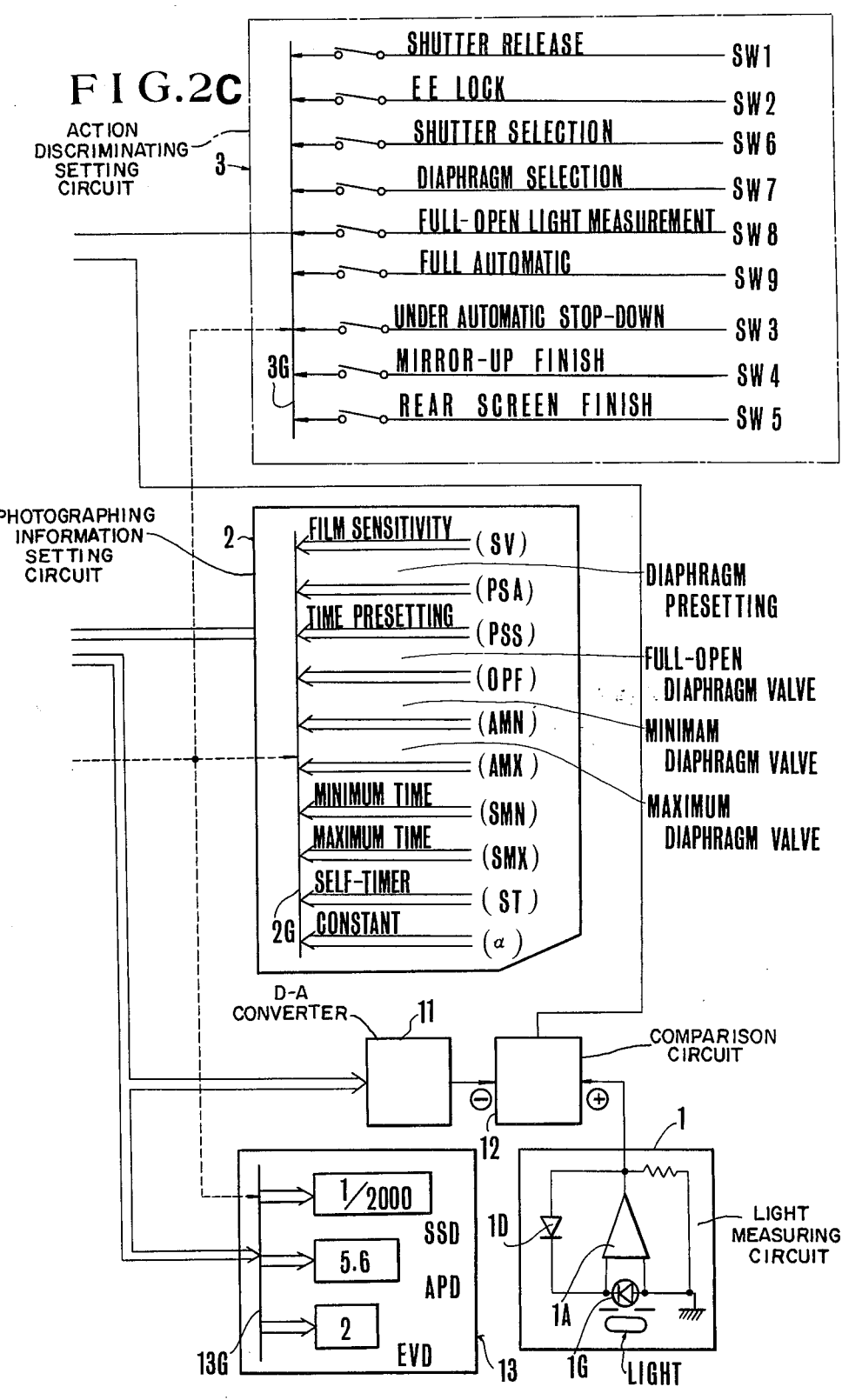

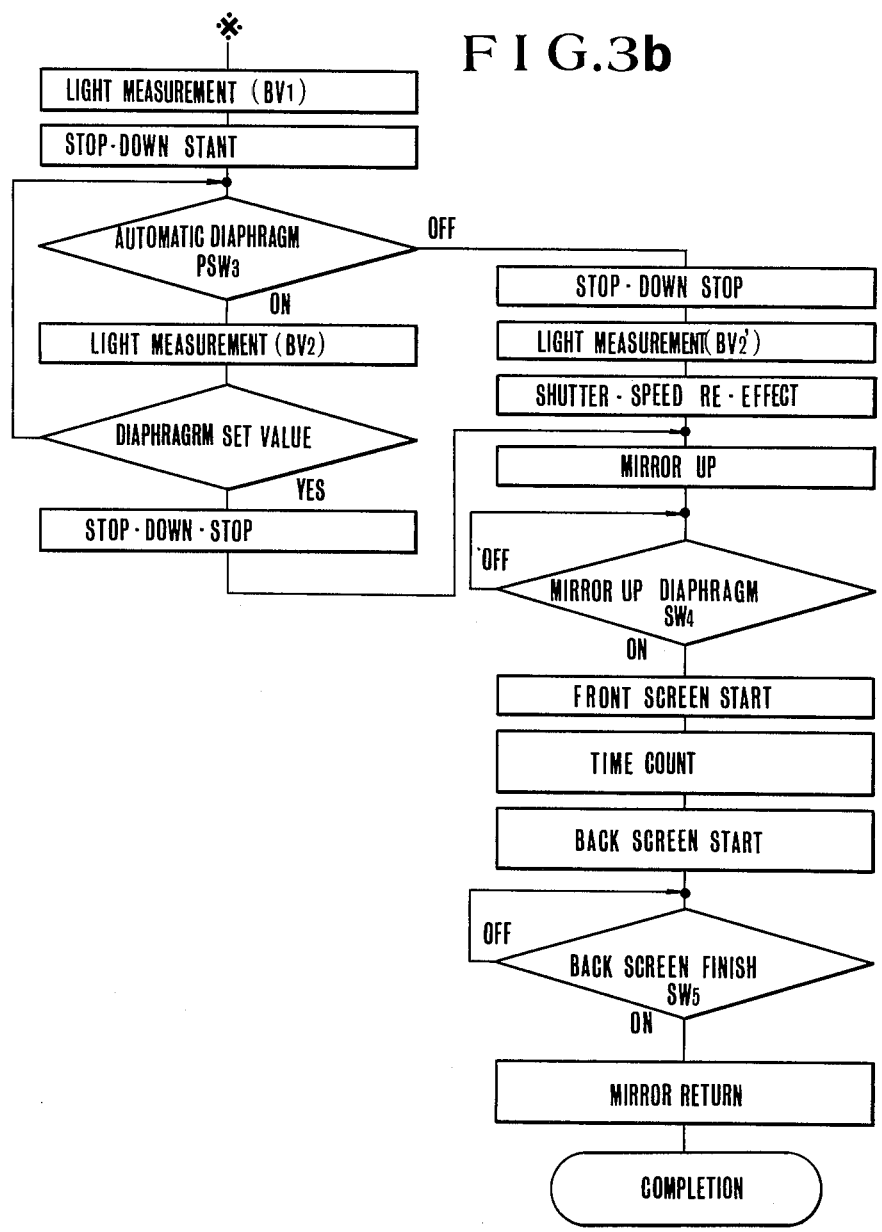

SYSTEM FOR INDICATING PHOTOGRAPHING CONDITIONS

This is a Continuation of application Ser. No. 514,895 filed Oct. 15, 1974, now abandoned.

BACKGROUND OF THE INVENTION

1. Field of the Invention

The present invention relates to a system for indicating photographing conditions in an automatic exposure control device which automatically controls exposure values of a camera, and more particularly relates to a system for indicating photographing conditions in a digital control camera in which analog amounts of object brightness and diaphragm value etc. are converted into digital amounts and computed to obtain a proper exposure amount by the output.

2. Description of the Prior Art

As for an indication device for a camera, an ammeter has been conventionally used in many cases, but the conventional indication device has been confronted with many defects vital to an indicating device for portable appliances such as a camera, because it often gets easily out of order when it is vibrated and thus it has low reliability.

In recent years, 1 solid illuminating element etc. has been increasingly used for the indicating elements for the camera to constitute a semi-permanent indicating device free from troubles and has been found to be very suitable for an automatic exposure-controlled camera having an exposure control device based on digital control. This type of indication system has been found to be profitable because it can be reduced considerably in size by integrating the circuit.

One of the objects of the present invention is to provide an indication system for an automatic exposure-controlled camera in which various informations necessary for photographing are computed as digital amounts and the exposure control circuit is controlled by the output of the digital amount to obtain a proper exposure amount, which system indicates photographing conditions, namely shutter time, diaphragm value, film sensitivity etc. as numerals or symbols practically used in a finder etc.

Another object of the present invention is to provide a system which indicates Appex amounts obtained by digital computation as numerals or symbols such as 1/125 ... or 1.4, 2 ...

Other objects and features of the present invention will be clear from the following descriptions.

DESCRIPTION OF THE PREFERRED EMBODIMENTS

The present invention will be described referring to the embodiments shown in the attached drawings.

Figure 1:
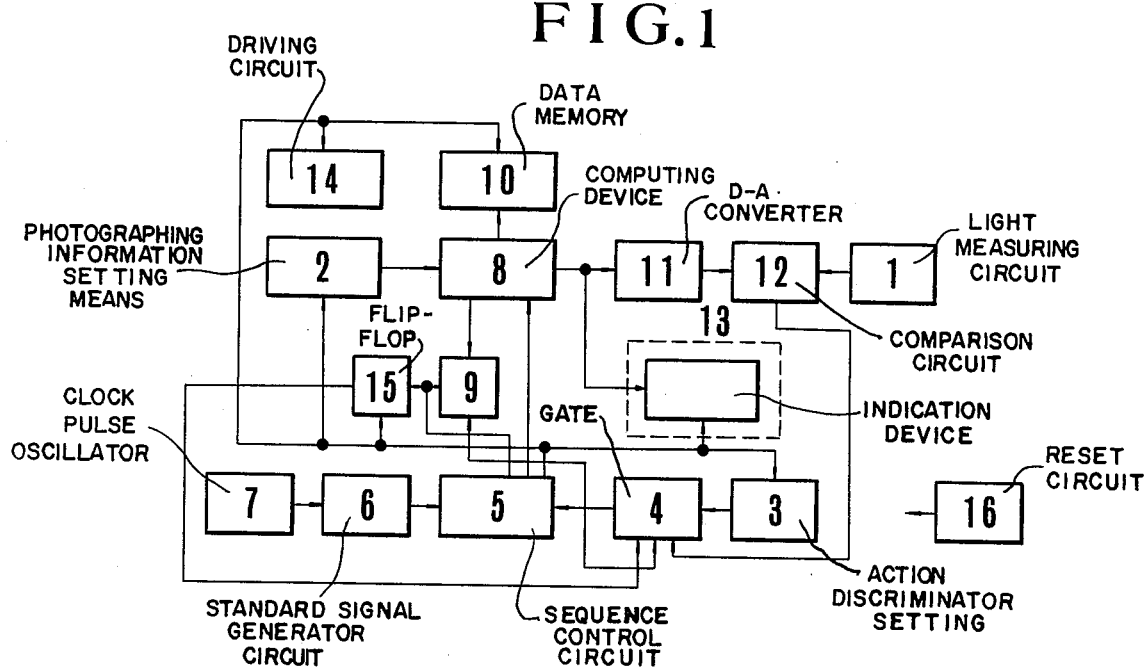
FIG. 1 is a block circuit for one embodiment of an automatic exposure control device by digital computation suitable for the indication system of the present invention.

In FIG. 1, 1 is a light measuring circuit for measuring the light from an object to be photographed, and brightness informations Bv are obtained as the output of the circuit. 2 is a photographing information setting circuit in which shutter time, diaphragm value, film sensitivity, etc., and photographing informations such as TV, AV and SV are obtained at the output of the circuit, and are input to the computing circuit 8. 3 is an action discrimination setting circuit which is composed of switches etc. which discriminate and set various functions within the camera, and controls the gate circuit 4 by its output. 5 is a sequence control circuit which is controlled by the output of a standard signal generation circuit 6 controlled by a clock pulse oscillator 7 and by the output from the gate 4 to actuate the circuits in the device in time sequence. 8 is an operation means such as a computing device which computes digital amounts of shutter time diaphragm value etc. from the Appex values of various informations.

Figure 6:
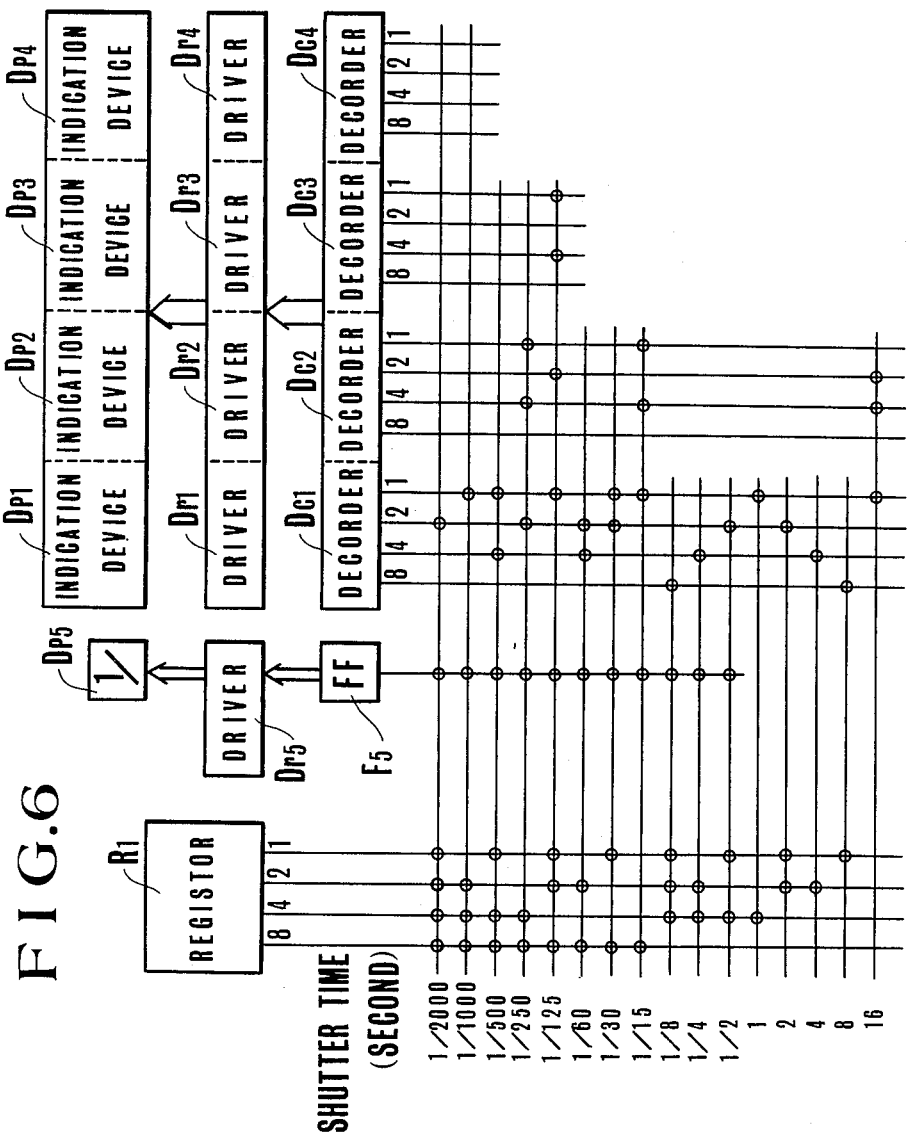
FIG. 6 is a circuit system for the shutter time indication circuit of the indication device in FIG. 2.
Figure 7:
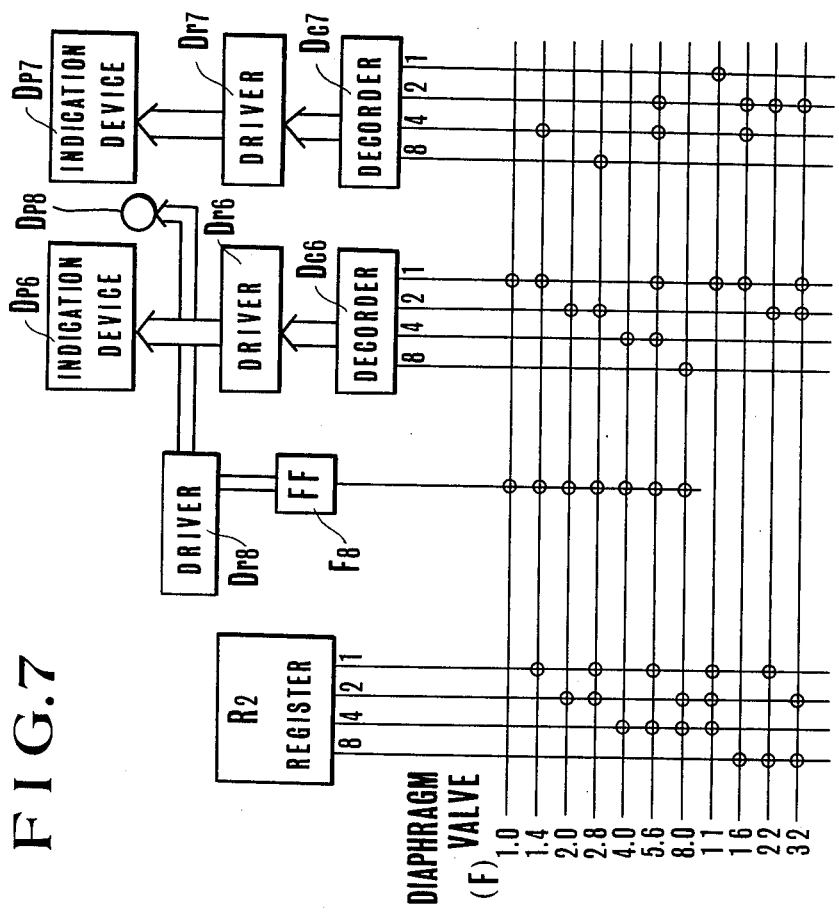
FIG. 7 is a circuit system showing the diaphragm indication circuit of the indication device in FIG. 2.

The output of the device 8 is input to a data memory device 10, a D - A convertor 11 and an indication device 13. The D - A convertor converts the digital amounts from the computing device 8 into analog amounts and inputs them into the comparision circuit 12. The analog light measurement from the light measuring circuit 1 is input into the comparison circuit 12 and is compared with the analog amount from 11. 13 is an indication device whose structure is shown in FIG. 6 and FIG. 7. The indication device 13 indicates the digital amounts (Appex values) of shutter time, diaphragm value etc. given by the computing device 8 as practical numerical figures or symbols using a decodor. 9 is a computation discrimination circuit, 15 is a flip-flop circuit for computation, which is actuated by the discrimination instruction signal from the sequence control circuit 5.

The operations of the device shown in FIG. 1 will be described briefly hereinunder.

When a power source (not shown) is applied, all contents of the flip-flop and the registors of the information setting circuit 2, the action discrimination setting circuit 3, the gate circuit 4, the computing device 8, the computation discrimination circuit 9, the data memory device 10, the indication device 13 and the drivin circuit 14 are cleared by the reset signal from the reset circuit 16. Then after a certain time determined by the sequence circuit 5, the computation device 8 is controlled by the sequence control circuit 5 and digital computation results are given at its output. These results are converted into analog amounts by the A - D convertor 11. These analog amounts are compared with the analog output from the light measuring circuit 1 in the comparator circuit 12 and the object brightness is subjected to A-D conversion by the computing device 8 to determine the Bv value.

When the film sensitivity information Sv from the photographing information setting circuit 2 is gated by the output of the sequence control circuit 5 and is transferred to the computing device 8, the addition of the above light measurements Bv and Sv is effected in the computing device 8 to obtain the exposure amounts Ev. This Ev value is transferred with a time schedule determined by the output of the sequence control circuit 5 to the registor of the data memory device 10 and housed therein. Based on the Ev value, the shutter time and the diaphragm value are determined to attain a proper exposure.

Figure 2:
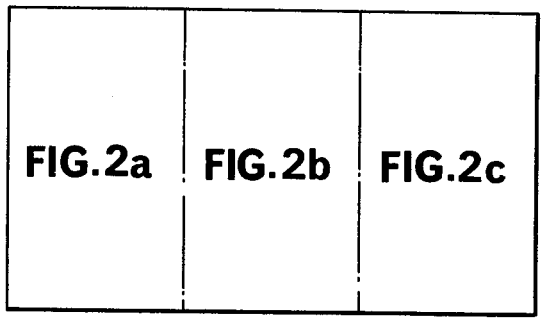
FIG. 2 is a block circuit showing specifically the automatic control device shown in FIG. 1.

In FIG. 2 showing the exposure control device in FIG. 1, the light measuring circuit 1 is composed of a light receiving element 1G, an amplifier 1A connected to the output of the element, and log-diode 1D having logarithmic compression characteristics and connected between the output terminal and the input terminal of the amplifier 1A. In the photographing information setting circuit 2, Sv is film sensitivity, PSA is a diaphragm value, PSS is a shutter time, OPF is a full-open diaphragm value of the photographing lens, AMN is the minimum diaphragm value, AMX is the maximum diaphragm value, SMN is the minimum shutter time, SMX is the maximum shutter time, ST is a set time of a self-timer, α is means for setting a constant, such as digital switch. At the output terminal of this switch, the gate circuit 2G is connected, and the output terminal of the circuit 2 is connected to the computing device 8, and thus the contents of the above switches are transferred to the computing device 8 in correspondence to the output of the sequence control circuit 5. The action discrimination setting circuit 3 serves to descriminate various functional states in the camera, for example the position of the mirror, or to set predetermined photographing conditions such as for shutter time preference photographing and disphragm preference photographing. This circuit is composed of a switch $SW_1$ which gets conductive in association with the push-down of the shutter button, a switch $SW_2$ for memorizing the object brightness as measured in the registor, a switch $SW_3$ for selecting either of automatic stop-down or preset diaphragm, a switch $SW_4$ which gets conductive in association with the arrival of the mirror at its upward terminal, a switch $SW_5$ which gets conductive in association with the arrival of the rear screen at the final end, a switch $SW_6$ for selecting the shutter preference photographing, a switch $SW_7$ for selecting the diaphragm preference photographing, a switch $SW_8$ for selecting the full-open light measuring, and a switch $SW_9$ for selecting the complete automatic exposure, and the output terminals of the above switches are all connected to the gate circuit 3G. The output terminal of the gate circuit 3G is connected to the gate circuit 4, and the gate circuit 3G is designed to output selectively the signals of the switches $SW_1$ to $SW_9$ to the gate circuit 4 in correspondence to the sequence control circuit 5. The switch $SW_1$ is designed to be locked at the off position when the shutter time and the diaphragm value are not indicated to an indicator SSD, APD mentioned hereinafter. The gate circuit 4 is a known-type circuit having a plurality of input terminals and output terminals, and composes an action descrimination signal circuit with the above action discrimination setting circuit 3. The sequence circuit 5 is composed of an instruction conversion circuit ROM, a sequence control counter SCC, containing an address of 5c, a SCC determination circuit 5a for calling an address of 5b, and the above SCC.5b and ROM.5c. As for the instructions in ROM, instructions for addition and subtraction instructions for designating the object to be added or subtracted, and instructions for jump, etc. are contained. The output from ROM.5c is other than the jump instruction, the SCC determination circuit 5a calls the next address in SCC after the completion of the action instructed by ROM.5c, while when a jump instruction is output by ROM.5c, the output is fed back to the SCC determination circuit and calls an address corresponding to the jump instruction and the output of the gate circuit. The standard signal generating circuit 6 is a known type circuit for controlling the operation time of the sequence control circuit 5, and has a plurality of input terminals and output terminals into which the output of the clock pulse oscillator 7 is given. The computing device 8 is composed of a circuit 8a for computing and ACC.8b for memorizing digitalized data. Further the computing circuit 8a has an addition and subtraction circuit for adding or subtracting one of the photographing informations of one register of the data memory device as selected by the object designating instruction or of the photographing information setting circuit 2 to or from the contents of ACC.8b at the time of issuance of the computing instruction or the object designating instruction from the sequence control circuit. A known type gate circuit for transferring the data of ACC.8b to one of the registors of the data memory device 10, or one of the indication device 13. The circuit 8a also has a circuit for addition or subtraction of the theoretical value of "1" to or from the contents of ACC.8b and a circuit for setting "1", "0" (hereinafter "1" or "0" represents the theoretical value) to any desired bit of ACC.8b.

ACC.8b is composed of registers of five bits in this example. In the following description, the lowest bit will be referred to as p and the subsequent bits will be referred to as q, r, s, t. The registers of the data memory device 10 are also composed of registers of five bits corresponding to ACC.8b. At the output terminal of the computing device 8, the data memory device 10, which memorizes computation results, the D - A convertor 11, and the computation discrimination circuit 9 are connected, while at the input terminal of the circuit, the photographing information setting means, the data memory device 10 and the sequence control circuit 5 are connected. The data memory device 10 is provided with a plurality of registers, such as the register SSR for shutter time, the register APR for diaphragm value, the register BR for temporarilly housing the computation results, and the register BVO for brightness. The comparator circuit 12 is a known type circuit composing A - D convertor for converting the analog amounts of the light measuring circuit into digital amounts by means of the D - A convertor 11 and the computing device 8. The indication device 13 is composed of an indicator SSD which indicates the contents of the register SSR, an indicator APD which indicates the contents of the register APR, an indicator EVD which indicates the step number of Ev error, and a gate circuit 13G which controls the above indicators in correspondence to the output of the sequence circuit.

The driving circuit 14 is provided with a lamp LM1 for indicating over-exposure, a lamp LM2 for indicating under-exposure, a solenoid L1 for effecting automatic stop-down, a solenoid L2 for driving the mirror up, a solenoid L3 for starting the front screen, a solenoid L4 for starting the rear screen, and a solenoid L5 for driving the mirror down, and at the input terminal of the circuit, the flip-flops (hereinafter abridged as F.F) $F.F_{1-7}$ are connected, and a gate 14G is provided for controlling the above $F.F_{1-7}$ by means of the output of the sequence control circuit 5. 15 is a flip-flop computation circuit for memorizing the operation sequence. 16 is a reset circuit for clearing the contents of all of the registers and the F.F circuit in correspondence to the power source (not shown). It may be possible that the computing device 8, the data memory device and the sequence control circuit 5, etc. are integrated in one piece.

Next, the operations of the embodiment shown in FIG. 2 will be explained in reference to FIG. 3 and FIG. 4.

When the power source (not shown) is applied, a reset signal is output from the reset circuit 16, and thereby the contents of all registers and F.F the photographing information setting circuit 2, the action discrimination setting circuit 3, the gate circuit 4, the computing device 8, the computation descrimination circuit 9, the data memory device 10, the indication device 13 and the deriving circuit 14 are cleared. Then after a certain time determined by the sequence control circuit, "1" is set at ACC.$8b$ of the computing device 8 successively under the control by the gate circuit 4 and the sequence control circuit 5, and the output corresponding to the digital amount is converted into an analog amount by the D - A convertor 11, and the analog output of the light measuring circuit 1 is compared with the analog amount converted by the above D - A convertor in the comparator circuit 12, and the amount of the object light is converted from A to D to determine the light measurement amount Bv. The film sensitivity information Sv set in the switch Sv of the photographing information setting circuit 2 is transferred to the computing device 8 through the gate circuit 2G by the output of the sequence control circuit 5, the addition operation of the light measurement amount Bv and the film sensitivity information Sv (B$\nu$ + S$\nu$) = E$\nu$ in the computing device 8, to compute the exposure amount E$\nu$, and thus obtained exposure amount E$\nu$ is transferred and housed in the register BR of the data memory device according to the timing determined by the output of the sequence control circuit. A proper shutter time and a proper diaphragm amount are determined by the following operations on the basis of the exposure amount E$\nu$.

Explanations will be modes for each of the four photographing mode; the shutter time preference photographing, the diaphragm preference photographing, the program photographing and the manually operated photographing.

(1) Shutter preference photographing in which the shutter time is set previously and the diaphragm value is automatically controlled. (See the route SSLC in FIGS. 3 and 4).

When the shutter selection switch SW$_6$ is "on" and the diaphragm selection switch SW$_7$ is "off", the signal is given to the sequence control circuit through the gate circuit 4. The contents of the switch PSS which sets the shutter time are transferred to the computing device 8 by the output of the sequence control circuit 5, and by the output of the sequence control circuit, the subtraction of the shutter time from the exposure amount $E\nu$ − $T\nu$ = A$\nu$ is effected in the computing device 8 to compute the diaphragm value A$\nu$. The content of the computing device 8 at this time is A$\nu$. The diaphragm value A$\nu$ is transferred to the computation discrimination circuit 9, and compared with the contents of the switches AMN and AMX of the photographing information setting means 2, namely compared with the minimum diaphragm value AMND and the maximum diaphragm value AMXD which have been already transferred thereto, and when the diaphragm value A$\nu$ is between the minimum diaphragm value and the maximum diaphragm value, it is housed in the register APR, transferred to the diaphragm indicator APP through the computing device 8 and indicated there. In this case, the shutter time contained in the switch PSS is also transferred to the indicator SSD through the computing device 8 and indicated.

Meanwhile, when the diaphragm value A$\nu$ computed by the computing device is outside the range from the minimum diaphragm value to the maximum diaphragm value due to excessive darkness or brightness of the object, the diaphragm value A$\nu$ is not transferred to the register APR and the indicator APD, but the contents of the switch AMN or AMX are transferred to the register APR from the computing device 8 and housed. Thus the content of the register APR is a limit diaphragm value preveously set. Then when the full automatic switch SW is "on", the signal is given to the sequence control circuit 5 through the gate circuit 4. As a result, the subtraction of the limit diaphragm value from the exposure amount (E$\nu$ − AMND) or (E$\nu$ − AMXD) is effected by the output of the sequence control circuit 5 in the computing device 8 to compute the shutter time. The shutter time thus computed is transferred to the computation discrimination circuit 9 and is compared with the contents of the switches SMN and SMX of the photographing information setting means 2, namely compared with the minimum shutter time SMND and the maximum shutter time SMXD which have been already sent thereto, and if the computed shutter time is between the minimum shutter time and the maximum shutter time, thus within the shutter time limit, the shutter time T$\nu$ is housed in the register SSR and transferred to the indicator SSD and indicated.

Thus, even if the computed diaphragm value is within the limit, but a proper exposure value is not obtained due to excessive brightness or darkness of the object in respect to the set shutter time in case of the SW$_9$ being on, the set shutter time is automatically corrected.

Also, after either one of the limit diaphragm values is set and when the switch SW$_9$ is "off", the light amount of the object is measured again, and the exposure amount E$\nu'$ based on this light measurement amount is set in the register BR. Namely, the content of the register BR is replaced from the amount E$\nu$ to the amount E$\nu'$, and similar operations are repeated on the basis of the exposure amount E$\nu'$.

(2) Diaphragm preference photographing where a diaphragm value is set preveously and the shutter time is controlled automatically. (See route ASLC in FIGS. 3 and 4).

When the shutter selection switch SW$_6$ gets "off" and the diaphragm selection switch SW$_7$ gets "on", and a diaphragm value is set preveously in the switch PSA, the diaphragm preference photographing is effected in the following manner.

When the shutter selection switch SW$_6$ and the diaphragm selection switch SW$_7$ are maintained "off" and "on" respectively, the signal is given to the sequence control circuit 5 through the gate circuit 4. As a result, the content of the switch PSA set as the diaphragm value is transferred to the computing device by the output of the sequence control device. Meanwhile the subtraction of the diaphragm value from the exposure amount (E$\nu$ − A$\nu$) = T$\nu$ is effected in the computing device 8 by the output of the sequence control circuit to compute the shutter time Tν. The content of the computing device 8 is Tν. The shutter time Tν is transferred to the computation discrimination circuit 9, and is compared with the contents of the switches SMN and SMX, namely with the minimum shutter time SMND and the maximum shutter time SMXD which have been already transferred thereto. If the computed shutter time is within the range from SMND to SMXD, it is housed in the register SSR and also transferred to the indicator SSD for shutter time indication through the computing device and indicated. In this case, the contents of the switch PSA, namely the diaphragm value is transferred to the indicator APD through the computing device 8 and indicated. On the other hand, when a proper exposure value can not be obtained even if the computed shutter time is within the limit due to the excessive brightness or darkness of the object in respect of the set diaphragm value, the diaphragm value previously set is automatically corrected, and subsequent operations are same as in case of the shutter time preference photographing.

Figure 3A:
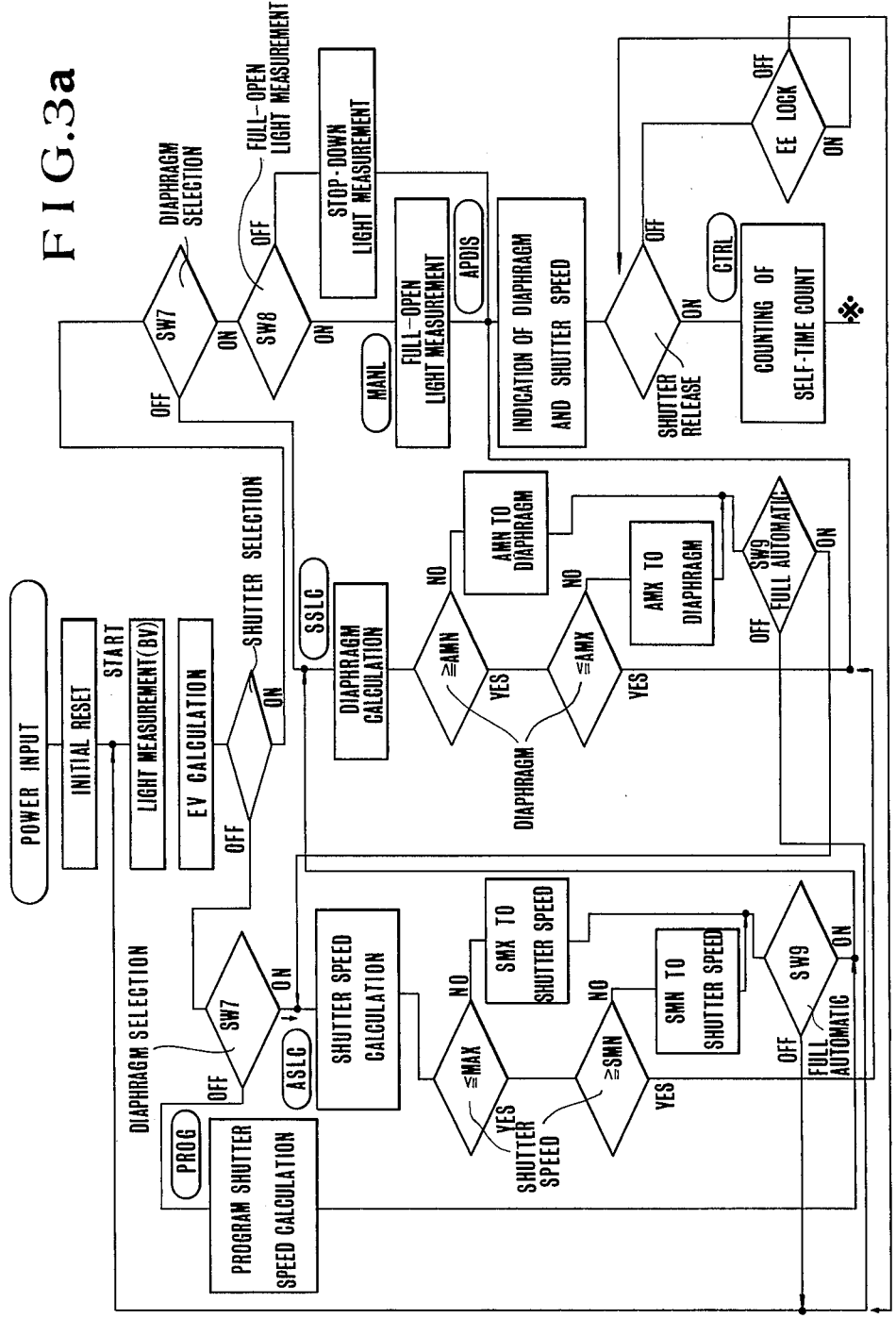
FIG. 3 is a flow-chart for explaining the operations in FIG. 2.
Figure 4A:
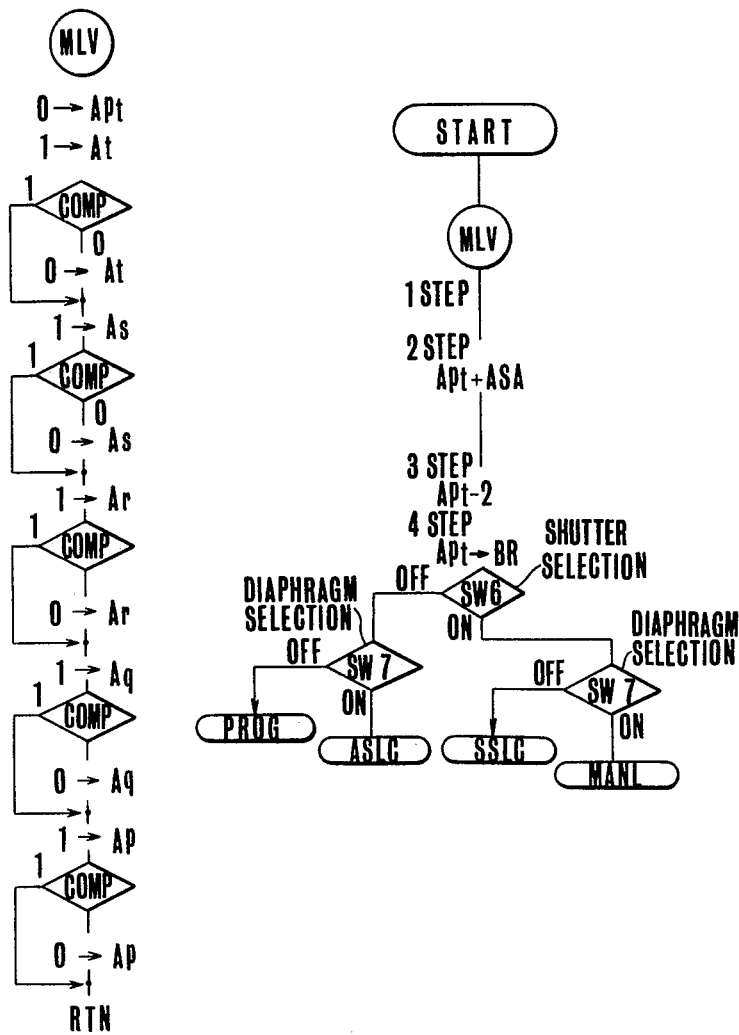
FIG. 4(a) is a flow-chart which shows the exposure computing process in FIG. 2 from the start to the mode selection.
Figure 4B:
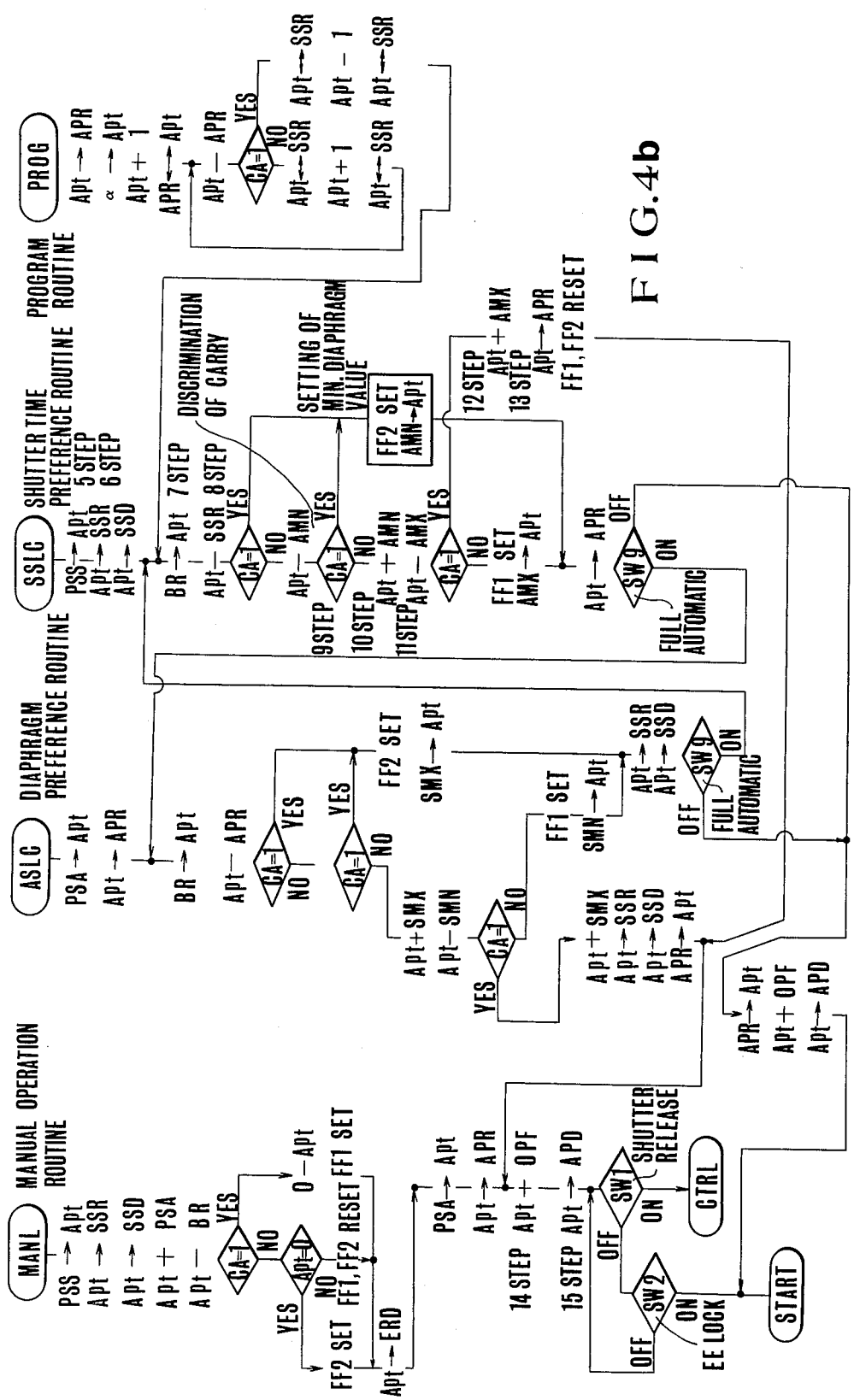
FIG. 4(b) is also a flow-chart for various modes which shows the exposure computing process in FIG. 2.

(3) Program photographing in which a previously set combination of the diaphragm value of the photographing lens and the shutter time obtained from computation of the object brightness and the film sensitivity is automatically controlled (See route PROG in FIGS. 3 and 4(b) ).

Figure 5:
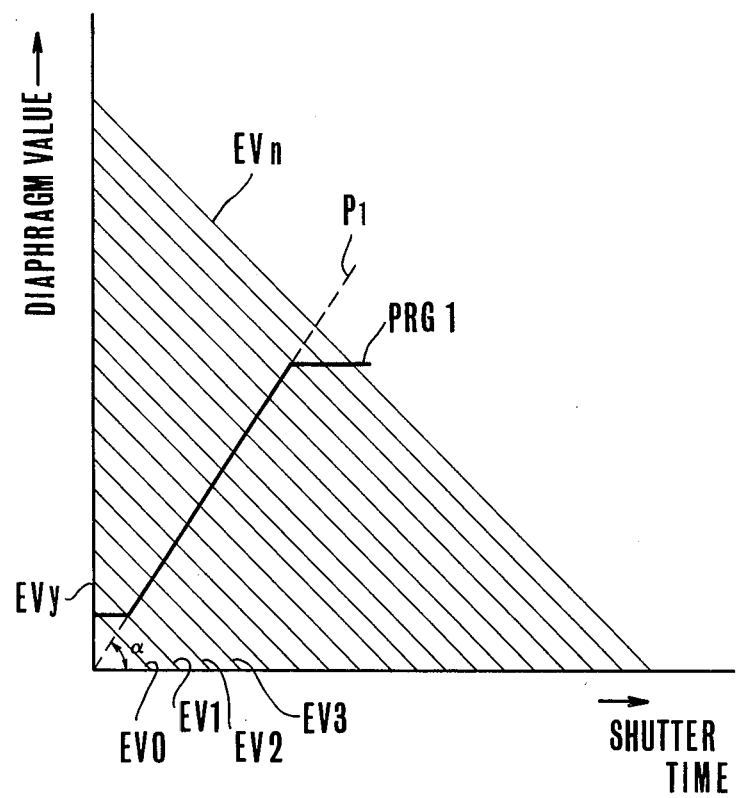
FIG. 5 explains the principle of exposure control for a program photographing.

The principle of the exposure control in the program photographing will be explained by referring to FIG. 5. In FIG. 5, the X axis represents the shutter time, the Y axis represents the diaphragm value, and Eν0, Eν1 . . . . Eν2 . . . Eνn represent exposure amounts and constitute a known Eν characteristics chart. PRG1 is the program curve, and P1 is a straight line having an inclination α. This straight line, as widely known, may be expressed by $$Y = \alpha X \ldots \quad (1)$$

and the Eν characteristics straight line Eν may be expressed by $$Y = -X + (E\nu_y) \ldots \quad (2)$$

When X and Y are sought from the formulae (1) and (2)

$$X = \frac{E\nu_y}{\alpha + 1} \quad (3)$$

$$Y = \alpha \frac{E\nu_y}{\alpha + 1} \quad (4)$$

Thus, the shutter time X can be given by dividing the output Eν$_y$ of the light measuring circuit by the sum of the previously set constant α and the constant 1, namely α + 1, and the diaphragm y can be obtained by the product of the thus obtained shutter time and the constant α. Therefore, it is understood that X and Y can be given by giving the constant to the computing device 8 and conducting multiplication and division on the basis of the exposure amount Eνy in the computing device.

According to the present invention, the computation as shown by the formula (3) is conducted by the computing device 8 and the data memory device 10, and after the shutter time X is computed, the route of the shutter time preference photographing is taken and the proper exposure is computed by the same operations as in case of (1). Namely, when the switch SW$_6$ for shutter time selection and the switch SW$_7$ for diaphragm selection are maintained "off", the signal is sent to the sequence control circuit 5 through the gate circuit 4, and the output of the circuit 5 is given to the computing device 8. Thereby, the exposure amount Eν measured by the light measuring circuit 1 is transferred to the register APR by the computing device 8 and the content of the switch α, namely the constant α is set in the computing device 8. After then "1" is added to the computing device 8. At this point, the content of the computing device 8 is (α + 1). Next, the exposure amount Eν housed in the register APR is divided by the (α + 1) of the computing device 8. This division is operated by the register APR and the computing device 8 according to a conventional method. The shutter time Tν resulting from this division is transferred from the computing device 8 to the register SSR and housed therein. In the computing device 8, the diaphragm value Aν is determined on the basis of this shutter time Tν through the shutter preference route, and this diaphragm value Aν is transferred to the register APR and housed therein, and at the same time this diaphragm value Aν and the shutter time Tν are transferred respectively to the indicators APD and SPD and indicated.

The above descriptions have been made for explaining the three photographing modes. The fourth photographing mode, namely the manually operated photographing also can be doned by the following operations (See route MANL in FIG. 4 (b) ). When the switch SW$_6$ for shutter selection is "on" and the switch for diaphragm selection is selected on the "on" side, the content of the switch PSS of the photographing information setting circuit 2 is transferred to the register SSR through the computing device 8 and also to the indicator SSD. The shutter time and the content of the switch PSA are added in the computing device by the output of the sequence control circuit 5, namely PPS + PSA = PEν is operated. Subsequently, the content of BR, namely the exposure amount Eν is compared with the preset exposure amount PEν to compute and indicate the over- and underexposure and the number of error steps.

From the above process, a proper diaphragm and a proper shutter time in each of the photographing modes are computed and are housed in the registers APR and SSR.

When the EE locking switch SW$_2$ is not closed, the computation for a proper exposure is conducted according to the above process with the timing (every several 10ms) determined by the sequence control circuit, and the contents of the registers APR and SSR are renewed and memorized.

When the EE locking switch SW$_2$ is closed, the proper exposure amount just before the closure is memorized in the registers APS and SSR and the contents of these registers are not renewed even if the brightness of the object changes after the switch closes.

Then the shutter release switch SW$_1$ is made "on", the mechanism of the camera is controlled by the route after CTRL in FIG. 3.

First, the time of the self-timer set in the switch ST is transferred to the computing device 8 and computed therein, and after the count-up the light measurement is conducted again to measure the light amount Bν. This light amount Bν is housed in one (not shown) of the registers of the data memory device 10. When the switch SW$_3$ is made "on" during the automatic stop-down, the automatic diaphragm F.F$_3$ is set to start the automatic stop-down. During this automatic stop-down, the light from the object which has passed the diaphragm blade is measured in sequence and stop-down is effected until the light amount reaches $Bv_1$-APR. When the light amount $Bv_2$ becomes as $Bv_1 -$ APR $= Bv_2$, a reset signal is output from the sequence control circuit to reset the F.F$_3$ and the stop-down operation is completed. In case where the diaphragm mechanism is a preset type mechanism as conventionally used, the switch SW$_3$ is made "off" during the automatic stop-down. Thereby the diaphragm value is set to a value corresponding to the register APR. However, it sometimes happens that this diaphragm value thus preset is not set to the proper diaphragm value due to the mechanical errors of the automatic stop-down mechanism, etc. Therefore, in the present invention, when the diaphragm presetting is completed the light measurement is done again on the basis of the preset diaphragm value, and the shutter time is computed again on the basis of the light measurement amount $Bv_2$ thus obtained and the computation result is housed in the register SSR. Namely, in case when the diaphragm is set by the preset type automatic diaphragm mechanism, shutter time correction is effected for correcting the computed shutter time.

When the above operations are completed, a signal for mirror-up is output from the sequence control circuit, and the F.F$_4$ is set and the L$_2$ is excited to effect the mirror-up. And when the switch for mirror-up completion is made "on", the F.F$_5$ for starting the front screen is set. Thereby the L$_3$ is excited to start the front screen. Then the content of the register SSR is counted, and after the count-up, the F.F$_6$ for starting the rear screen is set by the output of the sequence control circuit 5 to excite the L$_4$, and the rear screen is started. When the rear screen reaches a predetermined final terminal, the switch SW$_5$ is made on, and the F.F$_7$ is set. Thereby the solenoid L for mirror-down is excited to move the mirror-down and complete the photographing.

In Table 1 explanations of the symbols used in FIGS. 4(a) and 4(b) are set forth.

Table 1

| Symbols | Contents |
| --- | --- |
| DR ⟷ Apt | Interchange between content of DR and contents of all bits of Acc |
| DR ⟶ Apt | Contents of DR (BR, SSR, APR, Sv, PSA ... etc,) are given to all bits of Acc. Contents of DR are not changed. |
| Apt ⟶ DR | Contents of Acc are given to all bits of DR to renew the contents of DR |
| Apt ± DR | Contents of all bits of DR are added or subtracted from the contents of Acc and the result is retained in Acc. Contents of DR are not changed. |
| φ ⟶ Apt | All bits of content of Acc are rendered to φ (0 .... same hereinafter). |
| 1 ⟶ Apt | All bits of content of Acc are rendered to 1(0 ..... ). |
| φ ⟶ Ai | i bit of content of Acc is rendered to φ (i = p, q ... t) |
| 1 ⟶ Ai | i bit of content of Acc are rendered to 1 (i = p, q ... t) |
| φ ⟶ Apt | Content of Acc is subtracted from φ to take complement of Acc and the result is retained in Acc. |
| OFF SW$_i$ ON | Content of SW$_i$ (i = 1 – 9) is discriminated, and when the switch is off, the sequence to the arrow direction is performed, and when the switch is on, the sequence to ON direction is performed. |

Table 1-continued

| Symbols | Contents |
| --- | --- |
| 1 COMP 0 | Content of the comparator 12 is discriminated, and when output of DA converter is smaller than 1 of the light measuring circuit, the sequence jumps to the arrow of 1. |
| 1 CA=1 0 | When bit-up by addition or borrow by subtraction is caused in the computation performed by the previous step, the sequence jumps to the arrow of 1. |
| YES AT≠0 NO | If content of T bits (T = p, q, r, s, t, pt, (all bits) ) of Acc is 1, the sequence jumps the arrow. |
| (XXXXX) | This indicates connection between flows. |
| FF$_n$SET | FFn (n = 1 – 7) is set. |
| FFnRESET | FFn (n = 1 – 7) is reset. |
| \|t\|s\|r\|q\|p\| 16 8 4 2 1 Pt | Constitutional diagram of all bits of Acc. |

The automatic exposure device of the present invention will be described in more detail by taking up actual figures.

Suppose the case in which the full open F value $F = 1.4$, a film having ASA = 100 is used, the object brightness $Bv = 5$, and the shutter time is preset to 1/125 (sec.). In the camera, the object brightness is $Bv$, the diaphragm value is $Av$, the film sensitivity is $Sv$, and the shutter time is $Tv$. Then the condition for a proper exposure is $$Sv + Bv = Tv + Av \ldots \qquad (5)$$

In the formula (5), when each photographing condition is substituted, a proper rexposure value can be easily given. However, in the present invention, as the above photographing conditions are charged into the binary system as shown in the code table 2 in order to facilitate the computation operation, the formula (5) is corrected as mentioned hereinafter to obtain a proper diaphragm value.

In the formula (5), when the full-open F value $Av$ of the lens is taken into consideration, the formula (5) will be $$(Bv - Av_o) + Sv = Tv + (Av - Av_o) \qquad (6)$$

The parenthesis on the left side represents the brightness on the surface of a light receiving element, while the parenthesis on the right side represents the step number of stop-down from the full-open F values of the lens. As mentioned just before, the photographing conditions are expressed in the binary system as shown in the code table 2, it is necessary to add 10 steps to the film sensitivity, 4 steps to the shutter time and 8 steps to the diaphragm value. Thus the formula (6) is:

$$(Bv_d - Av_{od}) + (Sv_d + 10) = (Tv_d + 4) + (Av_d + 8 - Av_{od}) \qquad (7)$$

The addition of ($d$) in the formula (7), represents that binarized figures are put. (Particularly $Av_{od}$ means the step number of step-down from the stardard full-open F value $F = 1$).

From the code table 2, the formula (7) can be rewritten into $$(Bvd - Avod) + Svd = Tvd + (Avd - Avod) + 2$$
$$= Tvd + (Avd - Avod) + 00010 \quad (8)$$

The photographing conditions are as under from the code table 2:

Object brightness = $Bvd$ = 01101

Full-open F value $Avod$ of the lens = 00001

Film sensitivity $Svd$ = 00011

Shutter time $Tvd$ = 01011 \quad (9)

When the formula (9) is put into the formula (8)

$$(01101 - 00001) + 00011 = 01011 + (Avd - 00001) + 00010 \quad (10)$$

Thus, $(Avd - 00001) = 00010 \ldots$ \quad (11)

The left side of the formula (11) represents the step number of stop-down from the full-open F value, and the right side represents (2) if converted into the decimal figures. This means that under the above photographing conditions, a proper exposure can be obtained by taking two steps from the full-open F value F = 1.4 and setting the diaphragm value F = 2.8. It is well known that a proper exposure can be obtained when photographing is taken with the diaphragm value F = 2.8. According to the present invention, the operations of the formulae (8) - (11) are conducted as under to obtain a proper exposure.

The operations of an automatic exposure control device as shown in FIG. 2 under the above photographing conditions will be described referring to FIG. 2 and FIGS. 4(a) and 4(b) which are respectively a flow-chart for the computation process as well as Table 3 explaining the contents of the registers. The object brightness minus the full-open diaphragm value $Bvd$ - $Avod$ is measured by the light measuring circuit 1, the light amount thus measured is converted into a digital amount through the computing device 8, the D - A converter 11 and the comparator circuit 12 and is set in Acc.8$b$ in the computing device 8 as a binary figure (01100). This state is shown in Step 1 of Table 3. Further, the film sensitivity information (00011) contained in the switch S$v$ is transferred to Acc.8$b$ in the computing device 8 to to operate the addition of $(Bvd - Avod) + Svd + 01100 + 00011 = 01111$. This state is shown in Step 2 of Table 3. Further, although not shown in FIG. 2, the correction coefficient 2 shown in the formula (8) is subtracted from the content of Acc.8$b$ in the computing device 8, and the content of Acc.8$b$ becomes (01111 - 00010 = 01101) and this content is transferred to the register BR and housed as exposure amount.

Subsequent operations will be described by referring to the route SSLC for the shutter preference photographing shown in FIG. 4(b).

The shutter time $Tvd$ = 01011 which has been preset in the switch PSS is transferred to Acc.8$b$, but this shutter time $Tvd$ = 01011 is immediately transferred to the register SSR and housed. Therefore, at this stage data corresponding to the register BR and the register SSR are housed. Then the content of the register, namely $(Bvd - Avod + Svd - 00010)$ is transferred to Acc.8$b$, and the subtraction of Acc - SSR is performed by the computing device 8. Namely $(Bvd - Avod + Svd - 00010 \, 31 \, Tvd = 01101 - 01011 = 00010 = Avd - Avod)$ is performed to compute the diaphragm value $Avd$ (see Step 8 in Table 3). In this case it is assumed that the minimum diaphragm value is F2, namely a value one step down from F 1.4. By subtracting the content of the register AMN namely the minimum diaphragm value from Acc.8$b$ to perform $\{(Avd - Avod) - (\text{minimum diaphragm value}) = 00010 - 00001 = 00001\}$ and the result is transferred to the computation discrimination circuit 9 and to discriminate whether the borrow signal is generated or not. In this case, as no borrow signal is generated as shown in Step 9 in Table 3, the above minimum diaphragm value is added to Acc.8$b$ and the diaphragm value $Avd$ is again set in Acc-8$b$ (see Step 10 in Table 3). Then, the maximum diaphragm value contained in the switch AMX is subtracted from Acc.8$b$ and the above diaphragm value $Avd$ is discriminated again. Step 11 in Table 3 shows the discrimination results in case of the maximum diaphragm value F = 16. In this case, F = 16 represents the step number of stop-down from the full-open diaphragm value 1.4 to F = 16. Namely, 00111 is input in the switch AMX so that the operation of $00010 - 00111 = 11011$ is performed in the computing device 8, and in this case as the borrow signal is generated, the operation jumps to the 12 step in FIG. 4(b) and the maximum diaphragm value (00111) is added to Acc.8$b$ and the diaphragm value $Avd$ is set to Acc.8$b$ and housed in the register APR (see Step 12, Step 13 in Table 3). Thereafter, the full-open diaphragm value OPF (00001) is added to Acc.8$b$, so that the content of Acc.8$b$ becomes $(00010 + 00001 = 00011)$. The content of Acc.8$b$ is transferred to the indicator ABD and indicated. On the basis of the above diaphragm value $Avd$ = 00010, the diaphragm is determined as mentioned above to effect exposure with a shutter time $Tvd$ = 01011 and a proper exposure is obtained.

In the present invention, the step number (F = 2.8) is stop-down from the full-open diaphragm value $Avod$ is housed in the register APR, and when the proper diaphragm value is indicated, the step number (F = 2.8) of stop-down from the diaphragm value F = 1.0 is indicated by the indicator APD, thus performing the operations of steps 14 and 15.

In the foregoing descriptions, the case of shutter preference photographing has been explained. Almost same operations are performed in case of the diaphragm preference photographing, the program photographing and the manually operated photographing. Therefore, explanations will be omitted in these three cases.

Table 2

| Appex values determined by AV.BV. TV.SV. | Film sensitivity SVd | Shutter time TVd(sec) | Diaphragm value AVd | Codes |
|---|---|---|---|---|
| −8 | 12 | 16 | 1 | 00000 |
| −7 | 25 | 8 | 1.4 | 00001 |
| −6 | 50 | 4 | 2 | 00010 |
| −5 | 100 | 2 | 2.8 | 00011 |
| −4 | 200 | 1 | 4 | 00100 |
| −3 | 400 | 1/2 | 5.6 | 00101 |
| −2 | 800 | 1/4 | 8 | 00110 |
| −1 | 1600 | 1/8 | 11 | 00111 |
| 0 | 3200 | 1/15 | 16 | 01000 |
| 1 | 6400 | 1/30 | 22 | 01001 |
| R | | 1/60 | 32 | 01010 |
| 3 | | 1/125 | | 01011 |
| 4 | | 1/250 | | 01100 |
| 5 | | 1/500 | | 01101 |
| 6 | | 1/1000 | | 01110 |
| 7 | | 1/2000 | | 01111 |
| 8 | | | | 10000 |
| 9 | | | | 10001 |
| 10 | | | | 10010 |
| 11 | | | | 10011 |
| 12 | | | | 10100 |

Table 2-continued

| Appex values determined by AV.BV. TV.SV. | Film sensitivity SVd | Shutter time TVd(sec) | Diaphragm value AVd | Codes |
|---|---|---|---|---|
| 13 | | | | 10101 |
| 14 | | | | 10110 |
| 15 | | | | 10111 |

Table 3

| Step | Computing Device APD | Register BR | Register SSR | Register APR | Register APD |
|---|---|---|---|---|---|
| 1 | 01100 | | | | |
| 2 | 01111 (Apt + ASA) | | | | |
| 3 | 01101 (Apt-2) | | | | |
| 4 | 01101 (Hereinafter SSLC (enter the shutter preference route)) | → 01101 | | | |
| 5 | 01011 | | 01101 | | |
| 6 | 01011 | | 01101 → 01011 | | |
| 7 | 01101 ← | | 01101 | | |
| 8 | 00010(01101−01011) | | | | |
|  | ⟨CA⟩ | | | | |
| 9 | 00001 (00010−00001) | | | | |
|  | ⟨CA⟩ | | | | |
| 10 | 00010 | | | | |
| 11 | [CA] 11011 (00010−00111) | | | | |
|  | ⟨CA⟩ | | | | |
| 12 | 00010 | | | | |
| 13 | 00010 | | | | |
| 14 | 00011 (00010 + 00001) | | | 00010 | |
| 15 | 00011 | | | | 00011 |

In FIG. 6 showing a circuit system of one embodiment in which the indication system of the present invention is applied to the shutter time indication, $R_1$ is a register which corresponds to a part of the computing circuit 8 shown in FIG. 1 and FIG. 2 $Dc_1 - Dc_4$ are a decoder which converts signals input as a binary figure into a desired decimal figure. $Dr_1 - Dr_6$ are respectively a driven which drives the indicating device. $Dp_1 - Dp_5$ are respectively an indicating device composed of indicating elements such as an illumination diode, a liquid crystal, and Nixie tube (trademark). FF is a flip-flop circuit. Table 2 shows correspondency of codes to various photographing informations in which the Appex values −8 to 15 are expressed in the double code of 5 bits. It is understood from the table that a 4-bit code is satisfactory for indicating the shutter times 16 seconds to 1/2000 second in multiple sequence.

In FIG. 6, the shutter time is expressed by the indicators $Dp_1 - Dp_4$ of four figures and the mark indication $Dp_5$ indicating (1/). For example, in case of 1/2000 second, codes of 1, 1, 1, 1 are output from the register $R_1$ as shown in Table 2. Namely, as the output "1" is issued at the point of the matrix "0", $Dv_5$ which gives output to FF is actuated to indicate the symbol of (1/) through $Dp_5$, and the uppermost figure (first figure) is converted into a decimal figure by "0010" to indicate "2" in $Dp_1$, and the second and subsequent figures indicate "0" so that the figure or symbol to be indicated in the indicators $Dp_1 - Dp_6$ becomes (1/2000). In a similar way, 1/125 second indicates (1/125) by means of the output of the codes 1, 0, 1, 1.

FIG. 7 shows a circuit system for an embodiment in which the indication system of the present invention is applied to the diaphragm indication. In the figure, the same parts as in FIG. 6 are referred to by the same references. In FIG. 7, the indication of $Dp_8$ is driven by FF, $Dv_8$ to indicate "decimal point". As the indication of the diaphragm value is enough in two figures, and is expressed such as 1.4 and 2.0 by $Dp_6$, $Dp_7$ and $Dp_8$.

As above described, the numerical figures and symbols to be indicated in the finder for example can be indicated as the ones actually used in photographing in the present invention, and thus the indication is very easy to understand and the indication system is very convenient.

What we claim is:

1. A photographic information displaying apparatus for a camera comprising:
   a register for storing photographic information in digital form, said register generating binary coded signals corresponding to the stored contents;
   a decoder for decoding the content of said register, said decoder converting the binary coded signals into decimal-coded signals;

a first indication means for indicating in numerical figures a value corresponding to the output of said decoder;

a second indication means for indicating a fractional sign;

means for detecting whether or not the output signal of the register corresponds to a time shorter than one-half second of the shutter time, said means for hinging the indication means into an indicating state when the output of signal of the register corresponds to a time shorter than one-half second of shutter time;

whereby the first indication means indicates a fraction in cooperation with the second indication means when the second indication means is indicated, and the first indication means alone indicates an integer when the second indication means is not indicated.

2. An indication device according to claim 1, in which the first and second indication means are an illumination diode.

3. An indication device according to claim 1 in which the detecting means is a flip-flop circuit.

4. A photographic information displaying appartaus for a camera comprising:

a register for storing photographic information in digital form, said register generating binary coded signals corresponding to the stored contents;

a decoder for decoding the content of said register, said decoder converting the binary coded signals into decimal-coded signals;

a first indication means for indicating in a numerical figure a value corresponding to the output of the decoder;

a second indication means for indicating a decimal point;

detecting means for detecting whether or not the output signal of the register is an aperture value larger than F8 of the diaphragm value, said means for bringing the second indication means into an indicating state when the output signal of the register corresponds to a value larger than F8;

whereby the first indication means indicates figures below the decimal point together with the second indication means when the second indication means is indicated, and the first indication means alone indicates figures above the decimal point when the second indicating means is not indicated.

* * * * *